US006895170B1

(12) United States Patent
Lambert et al.

(10) Patent No.: US 6,895,170 B1
(45) Date of Patent: May 17, 2005

(54) METHOD AND APPARATUS FOR STORAGE AND PLAYBACK OF PROGRAMS RECORDED ON RANDOM ACCESS STORAGE MEDIA

(75) Inventors: Robert E. Lambert, Glendale, CA (US); W. Daniel Hillis, Toluca Lake, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/169,501

(22) Filed: Oct. 9, 1998

(51) Int. Cl.[7] ................................................. H04N 5/91
(52) U.S. Cl. ........................ 386/95; 386/125; 386/126
(58) Field of Search ............................... 386/4, 69–70, 386/125–126, 95; 725/32–36

(56) References Cited

U.S. PATENT DOCUMENTS

| | | | |
|---|---|---|---|
| 4,052,719 A | * 10/1977 | Hutt et al. ................. | 348/468 |
| 4,449,198 A | 5/1984 | Kroon et al. | |
| 4,860,122 A | 8/1989 | Kanamaru | |
| 5,351,132 A | 9/1994 | Sawabe et al. | |
| 5,457,669 A | 10/1995 | Kim et al. | |
| 5,477,516 A | 12/1995 | Takezawa | |
| 5,491,704 A | 2/1996 | Duron | |
| 5,504,585 A | 4/1996 | Fujinami et al. | |
| 5,510,906 A | 4/1996 | Yagasaki et al. | |
| 5,570,340 A | 10/1996 | Lee et al. | |
| 5,592,450 A | 1/1997 | Yonemitsu et al. | |
| 5,594,709 A | 1/1997 | Nagano et al. | |
| 5,596,564 A | 1/1997 | Fukushima et al. | |
| 5,596,565 A | 1/1997 | Yonemitsu et al. | |
| 5,691,972 A | * 11/1997 | Tsuga et al. ............ | 369/275.3 |
| 5,696,869 A | * 12/1997 | Abecassis .................... | 386/52 |
| 5,734,788 A | * 3/1998 | Nonomura et al. ......... | 386/126 |
| 5,774,170 A | * 6/1998 | Hite et al. ..................... | 348/9 |
| 5,907,321 A | * 5/1999 | Grossman et al. ............ | 725/32 |
| 5,957,695 A | * 9/1999 | Redford et al. ............... | 725/60 |
| 6,114,969 A | * 9/2000 | Hymel .................. | 340/825.44 |
| 6,160,570 A | * 12/2000 | Sitnik ........................... | 348/1 |
| 6,343,180 B1 | * 1/2002 | Kim ............................. | 386/65 |

OTHER PUBLICATIONS

Taylor, J., "DVD Frequently Asked Questions," {http://www.laserrot.com/info/techcorner/dvdfaq/dvdfaq.html} (visited Jan. 2, 2001).

* cited by examiner

Primary Examiner—Huy Nguyen
(74) Attorney, Agent, or Firm—The Hecker Law Group, PLC

(57) ABSTRACT

The present invention comprises a method and apparatus for playback of programs and other works recorded on random access storage media. One embodiment of the invention relates to random access storage media such as a DVD ("digital versatile disk" or "digital video disk") used to distribute motion pictures and other audio/video programs or works. The invention involves a manner of utilizing secondary storage space of the storage media not used by the primary program being distributed to store secondary programs such as movie trailers and product advertisements, and to present the secondary programs to the user in a topical and interesting manner. In one embodiment, storage space of a random access storage medium such as a DVD is allocated to a number of variously sized programs or program portions called "chapters." In one embodiment, each primary and secondary program constitutes a separate chapter. In this embodiment, each time the primary chapter is played, the DVD playback device plays a limited selection of secondary chapters before and/or after the primary chapter. In one embodiment, the sequence of secondary chapters played back varies each time the DVD is played. In this manner, as a viewer repeatedly views the DVD over time, a large variety of promotional material can be presented to the viewer without overburdening the viewer with overly-long sequences of promotions and trailers. In addition, because the sequence of trailers changes each time the DVD is viewed viewer interest is maintained.

44 Claims, 5 Drawing Sheets

METHOD AND APPARATUS FOR STORAGE AND PLAYBACK OF PROGRAMS RECORDED ON RANDOM ACCESS STORAGE MEDIA

BACKGROUND OF THE INVENTION

1. Field of the Invention

The invention relates to a method and apparatus for storage and playback of video, audio, multimedia and other data recorded on data storage media.

2. Background Art

When you watch a movie on videotape, you usually see an FBI copyright warning followed by one or more "previews" (also called "trailers") of upcoming theatrical movies or video release movies before the actual movie begins. If you own the videotape, you must endure the same previews every time you play the movie, or be forced to "fast forward" through the previews to reach the actual movie. This is a problem that results from the nature of videotape as a storage medium and from the manner in which movies are stored on videotape. This problem can be further understood by reviewing different types of data storage media and their operation.

Two common types of data storage media are random access storage media and sequential access storage media. Random access storage media are media in which storage locations can be accessed in any order. Sequential access (or serial access) storage media are media in which storage locations must be accessed in a particular order. Examples of random access storage media include floppy disk drives, hard disk drives, RAM cards, CD's and CD-ROM's, laser disks, and DVD's ("digital versatile disks" or "digital video disks"). An example of a sequential access storage medium is magnetic tape (e.g. videotape or audio tape). In random access storage media, the time to access a particular storage location is independent of the storage location. In sequential access storage media, the time required to access a particular storage location depends on the distance of the storage location to which access is sought from the storage location that is currently being accessed.

In sequential access storage media, there can be a significant delay in accessing a desired storage location if the current and desired storage locations are widely separated on the storage media. For example, it can take several minutes to traverse from a position at the beginning of a sequential storage medium such as a videotape to a position near the end. Accordingly, sequential access storage media is not well suited for rapidly accessing non-sequential storage locations.

Although sequential access media has the disadvantage of not allowing random access to storage locations on the tape, a counterbalancing advantage has been storage capacity. For example, a standard VHS videotape cassette can record up to six hours of analog video. Prerecorded videotapes containing recordings of theatrical motion pictures are typically available for rental, allowing movies to be rented and viewed by users at their leisure in their own homes.

As noted, during playback of a typical prerecorded videotape movie, the sequence of material presented to the viewer is similar to the sequence presented at a movie theater: the feature presentation is usually preceded by several short one to two minute trailers advertising products or presenting previews of upcoming movies.

A purchaser of a prerecorded videotape typically plays the tape several times during the course of ownership, often over a period spanning several years. Each time the videotape is played, the same programs are presented to the viewer in the same sequence: first the trailers, then the feature presentation. Although the trailers may be topical and of interest to the viewer when the videotape is first released, after repeated viewing, and passage of time, the trailers often become dated and uninteresting. Having to watch the same trailers each time the videotape is viewed detracts from the enjoyment of viewing the tape. Further, although the trailers may initially be effective for advertising products or services, after repeated viewing, they may become annoying and have a detrimental effect on the viewer.

SUMMARY OF THE INVENTION

The present invention comprises a method and apparatus for playback of programs and other works recorded on random access storage media. One embodiment of the invention relates to random access storage media such as a DVD ("digital versatile disk" or "digital video disk") used to distribute motion pictures and other audio/video data, programs or works. The primary data on the DVD is stored in "primary" storage space. Secondary programs such as movie trailers and product advertisements are stored in "secondary" storage space, and the secondary programs are presented to the user in a topical and interesting manner.

For example, in certain configurations, a DVD can store approximately 135 minutes of high quality digital video. A typical movie is from 70 to 135 minutes long. A DVD in this configuration has up to 65 minutes worth of secondary digital video storage space available in addition to the primary storage space used by the movie feature. This secondary storage space represents storage space that can be used by the DVD publisher to promote other movies and products to a viewer.

DVD's often have sufficient storage space to allow up to an hour or more of trailers and product promotions to be included on a DVD together with a feature presentation. However, a viewer would be very dissatisfied if the DVD presented an hour of trailers before the featured movie is presented, and would be unlikely to sit through a large number of trailers presented after the movie has finished playing.

The present invention provides a method and apparatus for storing secondary material in the extra storage space of a random access storage medium and playing it back to a viewer in an effective yet unobtrusive manner. In one embodiment, storage space of a random access storage medium such as a DVD is allocated to a number of variously sized programs or program portions called "chapters." In one embodiment, each primary and secondary program constitutes a separate chapter. Each chapter is assigned a chapter number. Chapters are stored in separate logical portions of the storage space on the storage medium, which may or may not constitute contiguous physical portions. One of the chapters constitutes the primary chapter containing the feature presentation. This chapter is designated chapter 1. The other, secondary chapters each contain a short (e.g. 1 or 2 minute) video presentation such as a movie trailer or a product advertisement. The secondary chapters are sequentially numbered, starting with chapter 2. There may be up to 50 or more secondary chapters.

In this embodiment, each time the primary chapter is played, the DVD playback device plays a limited selection of secondary chapters before and/or after the primary chapter. In one embodiment, the secondary chapters that are presented to the viewer are randomly or pseudo-randomly selected. For example, in one embodiment, a playback device selects and plays back four or five secondary chapters before playing back the primary chapter. The secondary chapters may be randomly or pseudo randomly selected, or may be selected according to some other criteria. In one embodiment, the selection of secondary chapters played back varies each time the DVD is played. In another embodiment, a portion of the selection of secondary chapters played back is kept fixed while another portion is varied. In this manner, as a viewer repeatedly views the DVD over time, a large variety of promotional material can be presented to the viewer without overburdening the viewer with overly-long sequences of promotions and trailers. In addition, because the sequence of trailers changes over time (as opposed to being static as in videotapes), viewer interest is maintained.

In a second embodiment, one or more of the chapters are provided with beginning and/or end dates and/or times defining time periods during which the chapter is to be presented to a viewer. In this embodiment, each time the DVD is played, only chapters for which the data of playback falls within the defined presentation period for that chapter are selected for presentation to the viewer prior to the main feature. For example, a film studio may include a trailer for a theatrical feature that will be released at some planned time in the future. The chapter containing that trailer may be date coded such that the chapter becomes available for presentation to a viewer during a time period around the feature's theatrical release date. In this way, the existing DVD can be used as part of a movie studio's publicity campaign for upcoming movie releases. Chapters may also include limited-time promotional offers. These chapters can be made available for presentation to a viewer during predefined time periods during which the offers are valid. The time periods during which individual chapters are available for presentation may also be limited to specified time periods during the day, certain days of the week, or other time intervals. Playback criteria other than time may also be used. For example, in one embodiment, certain chapters may be designated for playback to certain categories of viewers based on user information such as age, sex, and viewing interests.

DETAILED DESCRIPTION OF THE INVENTION

A method and apparatus for storage and playback of programs recorded on random access storage media is described. In the following description, numerous specific details are set forth in order to provide a thorough understanding of the invention. It will be apparent, however, to one skilled in the art, that the invention may be practiced without these specific details. In other instances, well-known features have not been described in detail in order not to obscure the invention.

The invention can be implemented using any type of random access storage media. Examples include, without limitation, floppy disk drives, hard disk drives, RAM cards, CD's and CD-ROM's, laser disks, VCD's ("video CD's") and DVD's ("digital versatile disks" or "digital video disks").

One embodiment uses a DVD as the random access storage media. In this embodiment, the DVD contains a primary program, such as a motion picture, and a plurality of secondary programs, such as movie trailers and product advertisements. The invention is, however, equally applicable to other types of primary and secondary programs, including musical recordings, computer software (including computer games, simulations and virtual environments), video recordings, multi-media programs, etc.

Figure 1:
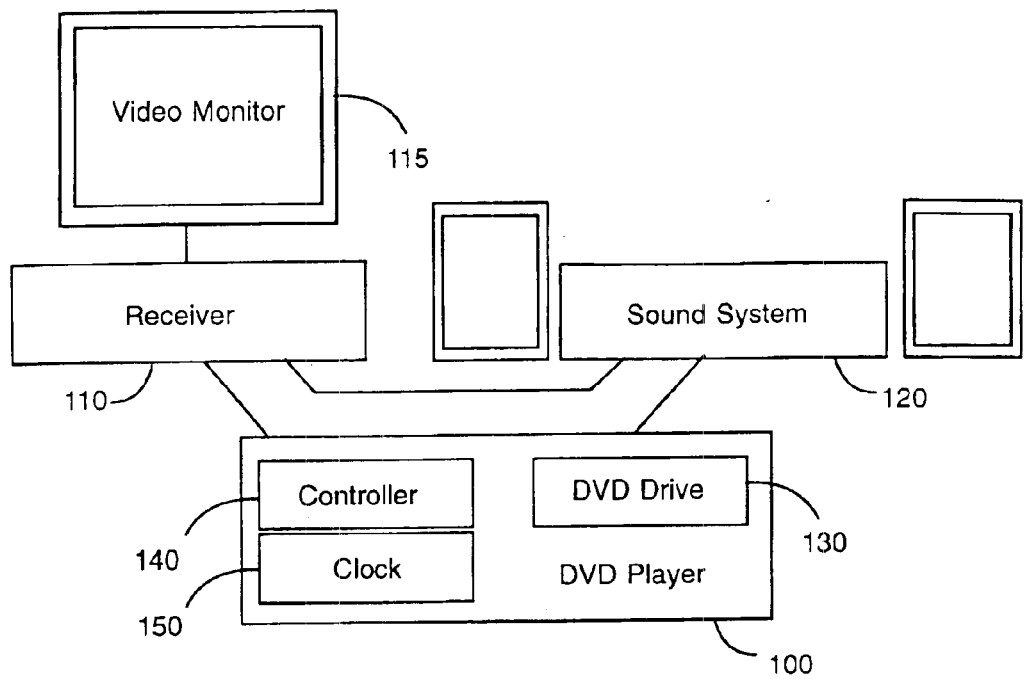
FIG. 1 is a block diagram of a DVD component system that can be used with an embodiment of the invention.

FIG. 1 shows an example of apparatus that may be used to playback programs recorded on a DVD in one embodiment of the invention. The apparatus of FIG. 1 includes a DVD player component 100 to which a receiver 110, a video monitor 115 and a sound system 120 are connected. Receiver 110 is any kind of receiver or video system that is capable of receiving a video signal output by DVD player component 100 and displaying it on video monitor 115. Monitor 115 is any kind of display monitor that can display the video signal received from receiver 110. Monitor 115 may, for example, comprise a cathode ray tube monitor, a projection monitor, a gas plasma monitor, an LCD monitor, etc. Sound system 120 is any kind of sound amplifier and speaker system capable of reproducing an audio signal output by DVD player component 100. Sound system 120 may, for example, comprise a stereo amplifier and speaker system, and may include features such as, for example, Dolby™ surround sound compatibility. Receiver 110, monitor 115 and sound system 120 may comprise separate components or may be integrated into one or more combined units.

DVD player component 100 includes a DVD drive 130, a controller 140, and, optionally, a clock 150, which may or may not comprise part of controller 140. In one embodiment, clock 150 is used to determine the data and time of day for use in selecting secondary programs for display. In other embodiments, the date and/or time of day may be determined by other sources, including, without limitation, an internal oscillator, a CPU clock, time data included in a video stream or ancillary data stream (e.g. the vertical blanking interval of a television transmission) passed through receiver 110 or an associated tuner, cable modem or other network interface or time data accessed via a dial-up telephone connection.

DVD player component 100 also includes various other electronic, optical, and mechanical components necessary for the playing back of pre-recorded DVD disks, as known to those skilled in the art.

Figure 2:
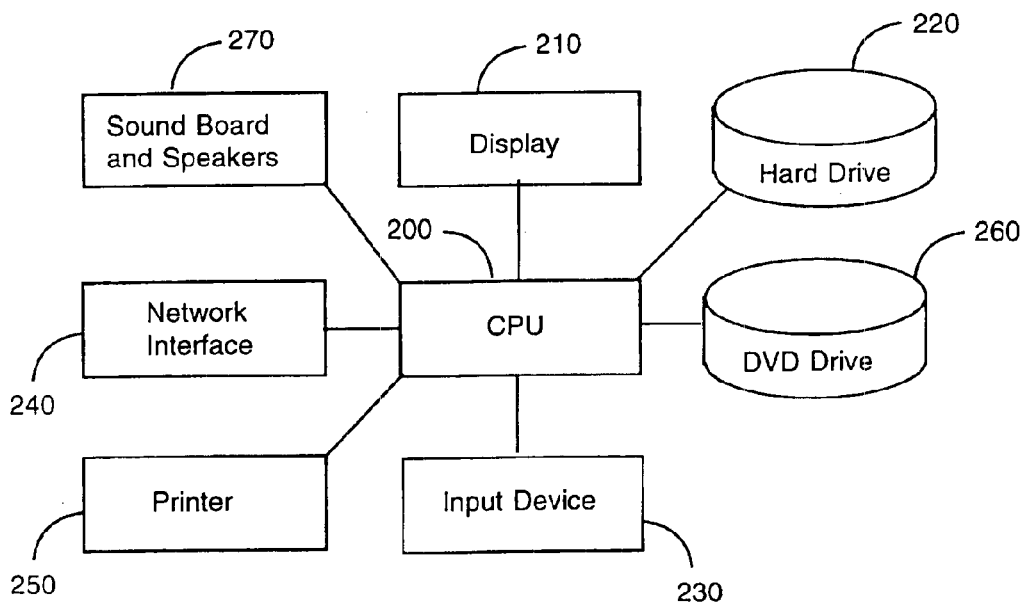
FIG. 2 is a block diagram of a computer system that can be used with an embodiment of the invention.

FIG. 2 shows a computer system that may be used to playback programs recorded on a DVD in one embodiment of the invention. The computer system shown in FIG. 2 includes a CPU unit 200 that includes a central processor, main memory, peripheral interfaces, input-output devices, power supply, and associated circuitry and devices; a display device 210 which may be a cathode ray tube display, LCD display, gas-plasma display, or any other computer display; an input device 230, which may include a keyboard, mouse, digitizer, or other input device; and a DVD drive 260 for retrieving data stored on a DVD. The computer system may or may not include non-volatile storage 220, which may include magnetic, optical, or other mass storage devices, and a printer 250. The computer system may also include a network interface 240, which may include a modem, allowing the computer system to communicate with other systems over a communications network such as the Internet. Any of a variety of other configurations of computer systems may also be used.

Figure 3:
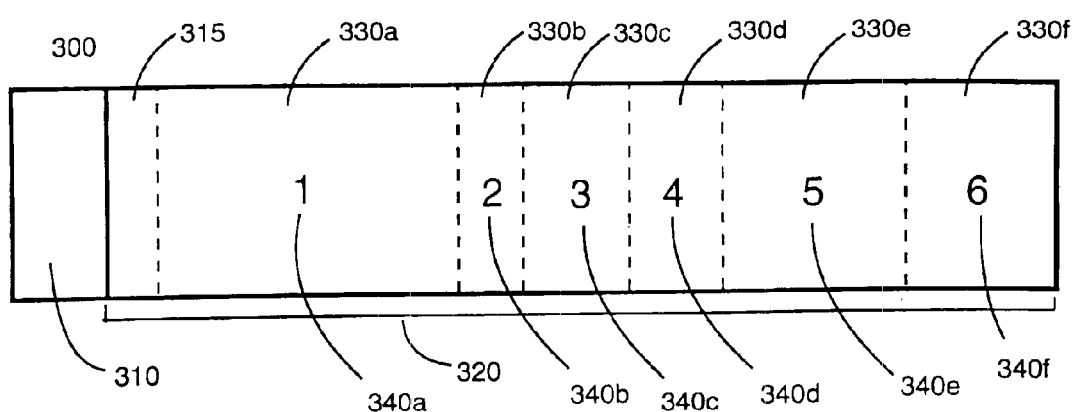
FIG. 3 is a graphical representation of a random access storage medium on which programs are recorded in accordance with an embodiment of the invention.

FIG. 3 is a graphical representation a random access storage medium. The random access storage medium shown in FIG. 3 may comprise a DVD or any other suitable random access storage medium.

In FIG. 3, storage medium 300 includes a file system information area 310 and program storage area 320. File system information area 310 contains information about the file system structure used to store data in storage medium 300. File system information area 310 may also contain directory information indicating the identity and storage location of programs stored in program storage area 320. File system information area 310 may also contain additional bookkeeping information describing the manner in which the programs stored in program storage area 320 are to be retrieved and played. Alternatively, such bookkeeping information can be stored in some other predetermined location on storage medium 300, such as a particular track or sector. Some or all of the bookkeeping and/or directory information may also be stored in an information file 315 in program storage area 320.

In the embodiment of FIG. 3, a number of separate programs or portions of programs (referred to herein as "chapters") 330a–f are stored in storage area 320. Each of chapters 330a–f comprises a logical set of data. A chapter 330 may represent, for example, all or part of a video or audio program, a computer program or file, or some other set of data. Each chapter 330 may or may not be stored in contiguous physical storage locations in storage medium 300. As shown in FIG. 3, each of chapters 330a–f can have any of a variety of sizes. In the embodiment of FIG. 3, chapters 330a–f include one large chapter 330a and a plurality of smaller chapters 330b–f. In the embodiment of FIG. 3, chapters 330a–f have been assigned corresponding chapter numbers 340a–f. Chapter 330a, the largest chapter (which may, for example, constitute a main program such as a movie) has been assigned chapter number "1." The remaining chapters 330b–f (which may, for example, constitute secondary programs such as product advertisements and movie trailers) have been assigned chapter numbers "2," "3," "4," "5" and "6," respectively. In the example of FIG. 3 the chapter numbers have been assigned in the order in which the chapters have been stored in storage area 320. However, the chapter numbers may be assigned in any order. Further, chapter numbers need not start at 1 and need not be consecutive. Chapter designations other than numbers, such as for example letters, words, or symbols, may also be used. As used herein, the term "chapter number" refers to any such number or non-number chapter designation.

Figure 4:
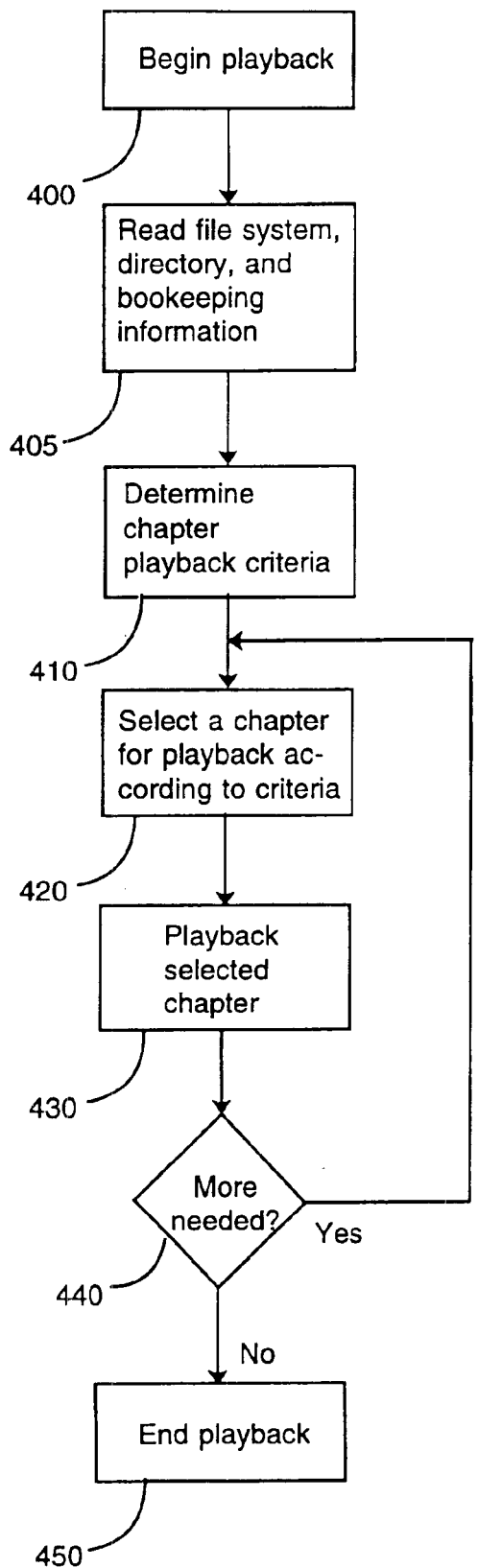
FIG. 4 is a flow chart of a method that may be used to playback the programs recorded on medium 300 of FIG. 3.

FIG. 4 is a flow chart of a method that may be used to playback the chapters recorded on medium 300 of FIG. 3. In this embodiment, chapters are played back according to playback criteria included in the bookkeeping information stored in file system area 310, information file 315, or in some other location, and/or header information that may be included in one or more of chapters 330a–f. Default playback criteria may be used to supplement or instead of playback criteria obtained from the bookkeeping information. The method may be implemented by means of appropriate programming in apparatus capable of retrieving data from medium 300. For example, if medium 300 is a DVD, the DVD component system of FIG. 2 or the computer system of FIG. 1 may be used. Operation of the method may be controlled by a control unit, such as, for example controller 140 of DVD player component 100 of FIG. 1 or CPU 200 of the computer system of FIG. 2.

According to the method of FIG. 4, playback of a medium begins at step 400. Playback may be initiated, for example, by inserting a DVD or other medium into an appropriate drive unit or by turning on the power to a playback apparatus in which an appropriate medium has been inserted, causing an appropriate signal to be sent to the control unit of the playback apparatus. In response, the control unit causes file system, directory and bookkeeping information to be read from the medium at step 405. As described above, the file system information specifies the file system structure used in the medium, the directory indicates the name and storage location of the chapters that are stored on the medium, and the bookkeeping information includes playback criteria that specifies the manner and sequence in which chapters recorded on the medium are to be presented to the user during playback.

At step 410, the playback criteria is determined from the bookkeeping information. For example, the bookkeeping information may specify that a specific number of secondary chapters should be selected in a particular manner and presented to the user before, during and/or after the main chapter. For example, the bookkeeping information may specify that three secondary chapters are to be randomly or pseudo randomly selected and presented to the user before the main chapter. Alternatively the bookkeeping information may specify that one of the chapters be presented before the main chapter, one half-way through the main chapter, and one after the main chapter. Any of a variety of other selection and presentation criteria may be specified. For example, the bookkeeping information may specify that secondary chapters should be selected from a subset of available secondary chapters based on factors such as the time, day or date at which the playback occurs, viewer criteria such as viewer interests (derived, for example, from a record of the types or genres of programs that have been previously played maintained by the control unit), whether or not a parental control function has been activated, and/or other factors. Alternatively, instead of extracting playback criteria from the bookkeeping information contained on the medium, default values for the playback criteria may be used by the playback apparatus. For example, the playback device may be programmed to playback a fixed number of secondary chapters each time a medium is played. In this case, the bookkeeping information may simply specify the number of secondary chapters available for playback on the medium. In one embodiment, the bookkeeping information comprises a number stored in a fixed location (for example on track 1 in the case of a DVD) of the medium indicating the number of secondary chapters on the medium.

At step 420 a chapter is selected for playback according to the playback criteria, and the chapter is played back at step 430. The chapter selected and played back may be a secondary chapter or a primary chapter, depending on the playback criteria and the state of playback.

At step 440, a determination is made as to whether additional chapters must be selected and played back according to the playback criteria, or whether all chapters specified by the criteria have already been played. If all chapters have been played, playback ends at step 450. If more chapters need to be played back, processing returns to step 420 where the next chapter is selected.

Figure 5:
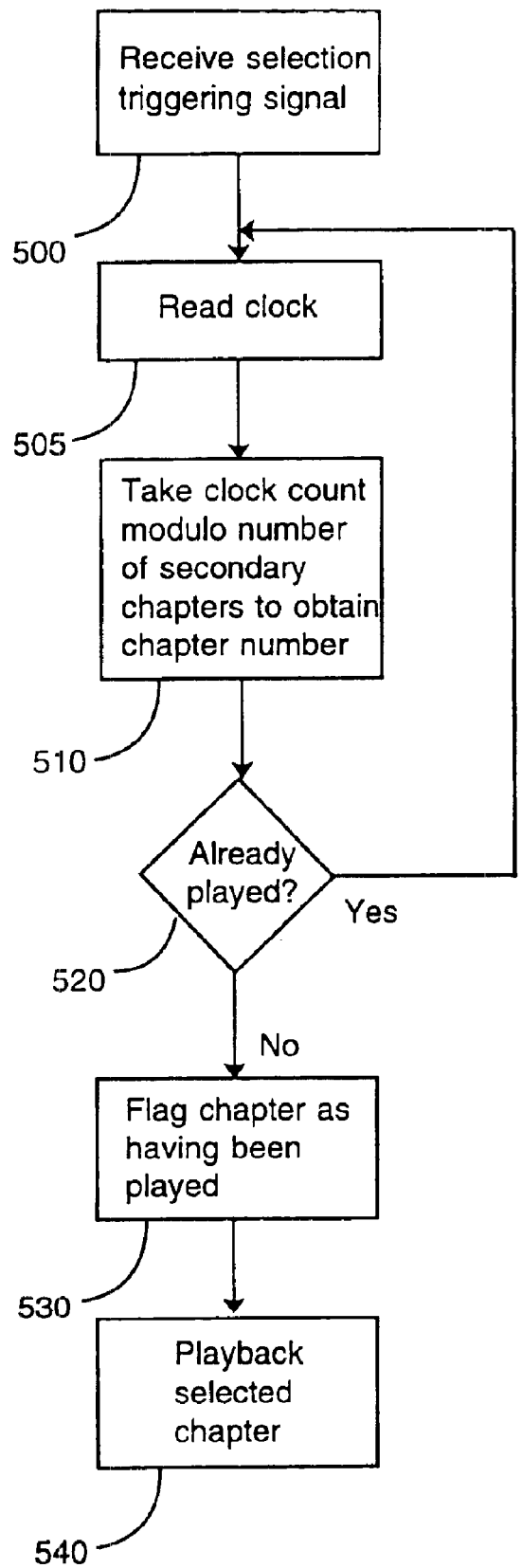
FIG. 5 is a flow chart of a method that may be used to select chapters for playback in an embodiment of the invention.

A variety of methods may be used to select a secondary chapter for playback at step 420. The method used in one embodiment is shown in FIG. 5. In this embodiment, a digital clock is used to pseudo-randomly select secondary chapters for playback. In this embodiment, the clock counts oscillations of a timing source, for example, a quartz crystal. The clock keeps count of oscillations that have occurred since a triggering event, such as, for example, power being applied to the clock for the first time. Typically, the clock counter has a finite number of bits, so that the count kept by the clock is the total number of counts modulo a fixed constant that depends on the number of bits of the counter.

In this embodiment, as shown in FIG. 5, the selection process begins at step 500 when the control unit of the playback apparatus receives a signal that indicates that a chapter is to be selected for playback. Such a signal may, for example, constitute a signal that playback of a medium has been initiated, indicating that a first chapter must be selected for playback. Alternatively, such a signal may constitute a signal that playback of a chapter has been completed, indicating that a subsequent chapter must be selected.

After receiving a signal that triggers the selection process at step 500, the control unit reads the clock counter at step 505. At step 510, the control unit converts the clock count read at step 505 to a value modulo the number of secondary chapters available for playback on the medium. The result is a chapter number that represents the chapter to be selected.

At step 520 the control unit determines whether the selected chapter has already been played, for example by checking whether the control unit has flagged the chapter as already having been played, by comparing the selected chapter number to a table or play list maintained by the control unit for the particular medium being played in which the chapter numbers of chapters that have already been played are recorded, or by some other means. In one embodiment, the control unit stores a separate count of the number of chapters that have been played for each medium that has been played. In this embodiment, the control unit identifies a medium from bookkeeping information contained on the medium, such as a serial number or a title, that identifies the program content of the medium. The control unit creates a separate table for each medium having a different program content. During playback of a particular medium, the control unit refers to the table for that medium to determine whether a particular chapter has already been played.

If the selected chapter has already been played, a different chapter must be selected, and the process returns to step 505. If the selected chapter has not yet been played, the control unit flags or otherwise records the chapter as having been played at step 530. The selected chapter is then played back at step 540. Step 540 may, for example, correspond to step 430 of FIG. 4.

Figure 6:
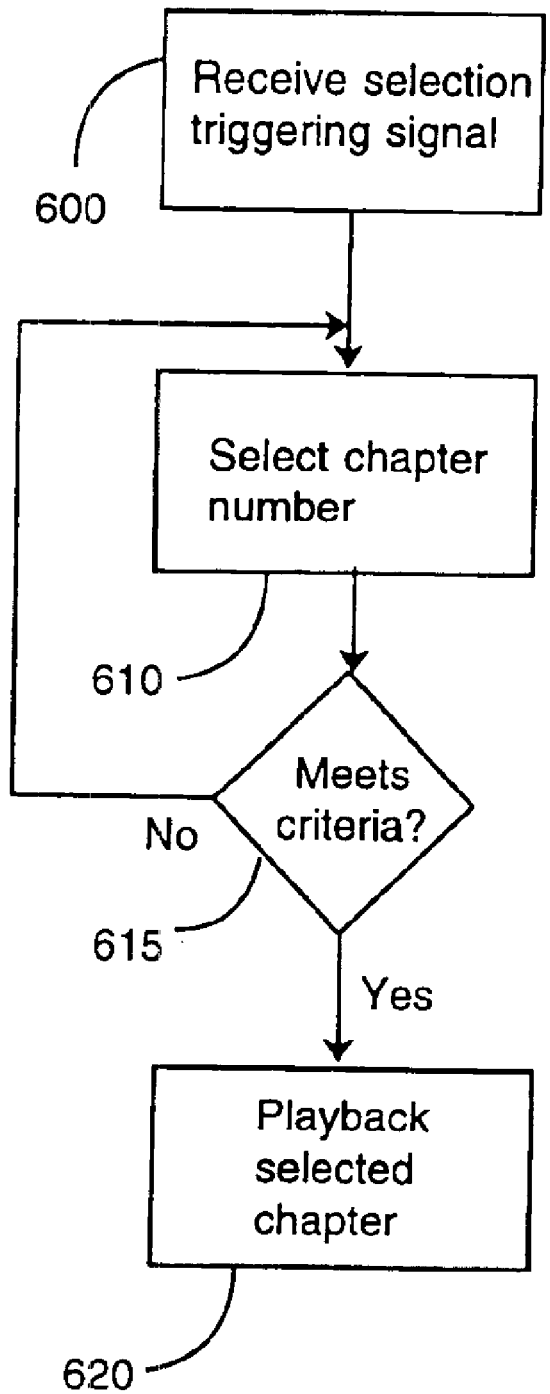
FIG. 6 is a flow chart of a method that may be used to select chapters for playback in an embodiment of the invention.

FIG. 6 shows a method used to select chapters for playback in another embodiment of the invention. In the method of FIG. 6, like in the method of FIG. 5, a signal indicating that a chapter is to be selected for playback is received at step 600. At step 610, a chapter number is selected. Any of a variety of mechanisms and methods can be used to perform step 610. For example, in one embodiment, a linear shift register is used to generate a pseudo-random number. That number is then taken, modulo the number of available chapters, to select a chapter for playback. In another embodiment, instead of using a clock to generate counts, the control unit keeps a running count, in non-volatile memory, of all chapters that have been played for all media, and takes that count, modulo the size of the counter, modulo the number of chapters in the medium, to select a chapter for playback. In another embodiment, the chapter numbers and sequencing information may be generated from data contained on the storage medium. For example, the storage medium may contain a sequence (which may be pseudo-random) of numbers specifying the sequence in which secondary chapters are to be played. In this case the variation in playback sequences of secondary programs for all copies of the storage medium can be specified and controlled. A pseudo-random chapter number may also be generated from data derived from physical characteristics specific to individual disks, such as, for example, error correction data. Any of a number of other chapter number generation methods may be used.

After a chapter number has been selected, a determination is made at step 615 as to whether the chapter meets any applicable selection criteria. For example, selection criteria may have been specified by bookkeeping information read from the medium when playback of the medium first began. Alternatively, selection criteria may be preprogrammed into the control unit or determined from user information (e.g. the age, sex, interests of a viewer) which the user may be prompted to supply either when the playback unit is first powered up or at subsequent times. In addition, or in the alternative, in certain embodiments, selection criteria may be wholly or partly specified by the user. A chapter itself may also specify selection criteria applicable to that chapter. For example, data stored in a header of the chapter or elsewhere may specify that the chapter is to be viewed only between particular dates, by particular categories of viewers, or at particular times of the day. The selection criteria may also specify, for example, that no chapter is to be repeated before all or a subset of all available chapters have been played.

If is determined that the applicable selection criteria has not been met at step 615, processing returns to step 610, and another chapter is selected. If it is determined that the criteria has been met, the chapter is played back at step 620.

Thus, a method and apparatus for storage and playback of programs recorded on random access storage media has been described. Although the invention has been described with respect to certain example embodiments, it will be apparent to those skilled in the art that the present invention is not limited to these specific embodiments. Further, although the operation of certain embodiments has been described in detail using certain detailed process steps, some of the steps may be omitted, the steps may be performed in different sequences, or other similar steps may be substituted without departing from the scope of the invention. Other embodiments incorporating the inventive features of the invention will be apparent to those skilled in the art.

What is claimed is:

1. A method for playing back a first set of data and a plurality of a second set of data recorded on a random access storage medium comprising:

obtaining a first set of data and a plurality of second sets of data recorded on a random access storage medium, wherein said first set of data and said plurality of second sets of data are integrally unrelated, said plurality of second sets of data having a fixed portion and a variable portion;

obtaining playback criteria from said random access storage medium;

applying said playback criteria to obtain a subset of said plurality of second sets of data for playback with said first set of data, wherein said subset of said plurality of second sets of data comprises said fixed portion and a portion of said variable portion such that said subset of said plurality of second sets of data varies for each playback of said first set of data; and playing back said subset of said plurality of second sets of data and said first set of data in accordance with said playback criteria.

2. The method of claim 1 wherein said playback criteria specify a number of said plurality of second sets of data to select for playback.

3. The method of claim 1 wherein said playback criteria include playback time period for one or more of said plurality of second sets of data.

4. The method of claim 1 wherein said playback criteria specify that a subset of said plurality of second sets of data is to be played back a predetermined number of times.

5. The method of claim 4 wherein said predetermined number of times is one.

6. The method of claim 1 wherein said playback criteria specifies viewer characteristics.

7. The method of claim 1 wherein said playback criteria specifies that an indicated number of said subset of said plurality of second sets of data are to be played back prior to playing back said first set of data.

8. The method of claim 1 wherein said playback criteria is supplemented with a second playback criteria provided by a playback device used to play back said first set of data and said plurality of second sets of data.

9. The method of claim 1 wherein said plurality of second sets of data comprise portions of said playback criteria.

10. The method of claim 1 wherein said first set of data comprises a video feature.

11. The method of claim 10 wherein said plurality of second sets of data comprise video advertisements.

12. The method of claim 1 wherein said subset of said plurality of second sets of data are pseudo randomly selected.

13. A random access storage medium comprising:
a first set of data prerecorded on a random access storage medium;
a plurality of second sets of data prerecorded on said random access storage medium, wherein said first set of data and said plurality of second sets of data are integrally unrelated, said plurality of second sets of data having a fixed portion and a variable portion; and
playback criteria encoded on said random access storage medium, said playback criteria identifying a subset of said plurality of second sets of data to be played back in conjunction with each play back of said first set of data, wherein said subset of said plurality of second sets of data comprises said fixed portion and a portion of said variable portion such that said subset of said plurality of second sets of data varies for each playback of said first set of data.

14. The storage medium of claim 13 wherein said playback criteria specifies a number of said plurality of second sets of data to select for play back.

15. The storage medium of claim 13 wherein said playback criteria specifies a period of time.

16. The storage medium of claim 13 wherein said playback criteria specifies that one or more of said plurality of second sets of data is to be played back a predetermined number of times.

17. The storage medium of claim 16 wherein said predetermined number of times is one.

18. The storage medium of claim 13 wherein said playback criteria specifies viewer characteristics.

19. The storage medium of claim 13 wherein said playback criteria specifies that an indicated number of said plurality of second sets of data are to be played back prior to playing back said first set of data.

20. The storage medium of claim 13 wherein a portion of said plurality of second sets of data comprise portions of said playback criteria.

21. The storage medium of claim 13 wherein said first set of data comprises a video feature.

22. The storage medium of claim 21 wherein said plurality of second sets of data comprise video advertisements.

23. The storage medium of claim 13 wherein said storage medium comprises a DVD.

24. A player for playing back programs recorded on random access storage media, said player comprising:
a storage medium access unit for retrieving data from a random access storage medium;
a control unit comprising a computer processor for controlling operation of said storage medium access unit;
computer processor readable program code configured to cause said computer processor to:
retrieve from said random access storage medium information identifying a first set of data and a plurality of second sets of data stored on said storage medium, wherein said first set of data and said plurality of second sets of data are integrally unrelated, said plurality of second sets of data having a fixed portion and a variable portion;
retrieve playback criteria stored on said storage medium; and
select a subset of said plurality of second sets of data and said first set of data from said storage medium according to said playback criteria, wherein said subset of said plurality of second sets of data comprises said fixed portion and a portion of said variable portion such that said subset of said plurality of second sets of data varies for each playback of said first set of data.

25. The player of claim 24 further comprising a pseudo random number generator for generating a number used for selecting said subset of said plurality of second sets of data.

26. The player of claim 24 wherein said random access storage medium comprises a DVD.

27. The player of claim 24 wherein said storage medium access unit comprises a DVD drive.

28. An article of manufacture comprising:
a computer processor usable medium having computer processor readable program code embodied therein for playing back a first set of data recorded on a random access storage medium, said storage medium comprising a plurality of second sets of data in addition to said first set of data, said first set of data and said plurality of second sets of data integrally unrelated, said plurality of second sets of data having a fixed portion and a variable portion, said program code comprising:
computer processor readable program code configured to cause a computer processor to determine playback criteria applicable to said storage medium; and
computer processor readable program code configured to cause a computer processor to select and play back a subset of said plurality of second sets of data according to said playback criteria in conjunction with playing back said first set of data, wherein said subset of said plurality of second sets of data comprises said fixed portion and a portion of said variable portion such that said subset of said plurality of second sets of data varies for each playback of said first set of data.

29. The article of manufacture of claim 28 wherein said playback criteria specifies a number of second sets of data to select for play back.

30. The article of manufacture of claim 28 wherein said playback criteria specifies a period of time.

31. The article of manufacture of claim 28 wherein said playback criteria specifies that a set of data of said plurality of second sets of data is to be played back a predetermined number of times.

32. The article of manufacture of claim 31 wherein said number of times is one.

33. The article of manufacture of claim 28 wherein said playback criteria specifies viewer characteristics.

34. The article of manufacture of claim 28 wherein said playback criteria specifies that an indicated number of second sets of data are to be played back prior to playing back said first set of data.

35. The article of manufacture of claim 28 wherein a first portion of said playback criteria is provided by a playback device used to play back said sets of data.

36. The article of manufacture of claim 28 wherein a second portion of said playback criteria is recorded on said storage medium.

37. The article of manufacture of claim 28 wherein a portion of said plurality of second sets of data comprise portions of said playback criteria.

38. The article of manufacture of claim 28 wherein said first set of data comprises a video feature.

39. The article of manufacture of claim 38 wherein said plurality of second sets of data comprise video advertisements.

40. The article of manufacture of claim 28 further comprising computer processor readable program code configured to cause a computer processor to pseudo randomly generate a number used to select said subset of said plurality of second sets of data.

41. A method for playing back data prerecorded on a random access storage medium, said storage medium comprising a plurality of variable sets of data in addition to a fixed set of data, said fixed set of data and said plurality of variable sets of data integrally unrelated, said method comprising:

obtaining playback criteria applicable to said plurality of variable sets of data on said prerecorded random access storage medium wherein said playback criteria specifies which subset of said plurality of variable sets of data are for playback;

selecting a subset of said variable sets of data according to said playback criteria, wherein said subset of said variable sets of data is variable for each playback of said fixed set of data; and playing said subset in union with playing back said fixed set of data in accordance with said playback criteria.

42. A player for playing back programs recorded on random access storage media, said player comprising:

a storage medium access unit configured to retrieve data from a random access storage medium having a first set of prerecorded data and a plurality of second sets of prerecorded data, wherein said first set of prerecorded data and said plurality of second sets of prerecorded data are integrally unrelated, said plurality of second sets of data having a fixed portion and a variable portion;

a control unit comprising a computer processor for controlling operation of said storage medium access unit;

computer processor readable program code configured to cause said computer processor to:

retrieve playback criteria stored on said storage medium, said playback criteria identifying a subset of said plurality of second sets of prerecorded data to be played back;

retrieve said subset of said plurality of second sets of prerecorded data and said first set of prerecorded data from said storage medium according to said playback criteria, wherein said subset of said plurality of second sets of data comprises said fixed portion and a portion of said variable portion such that said subset of said plurality of second sets of data varies for each playback of said first set of data; and play said subset of said plurality of second sets of prerecorded data and said first set of prerecorded data in accordance with said playback criteria.

43. The player of claim 42 wherein said sets of data in said subset of said plurality of second sets of data are pseudo randomly selected.

44. The player of claim 42 wherein said playback criteria specifies a period of time at least one of said plurality of second sets of prerecorded data are to be played back.

* * * * *